United States Patent

Ochi et al.

Patent Number: 5,812,316
Date of Patent: Sep. 22, 1998

[54] METHOD FOR MAKING RETROREFLECTIVE SHEETING

[75] Inventors: Katsura Ochi, Kashiwa; Masaki Yoshizawa, Sano; Osamu Tanaka, Hiratsuka, all of Japan

[73] Assignee: Nippon Carbide Kogyo Kabushiki Kaisha, Tokyo, Japan

[21] Appl. No.: 424,362
[22] PCT Filed: Oct. 30, 1992
[86] PCT No.: PCT/JP92/01407
§ 371 Date: Apr. 21, 1995
§ 102(e) Date: Apr. 21, 1995
[87] PCT Pub. No.: WO94/10591
PCT Pub. Date: May 11, 1994

[30] Foreign Application Priority Data

Oct. 23, 1992 [JP] Japan .................. 4-307965

[51] Int. Cl.⁶ ............ G02B 5/124; G02B 5/128
[52] U.S. Cl. ............ 359/530; 359/531; 359/538; 359/539; 359/540
[58] Field of Search .................. 359/530, 531, 359/538, 539, 540

[56] References Cited

U.S. PATENT DOCUMENTS

| | | | |
|---|---|---|---|
| 4,025,159 | 5/1977 | McGrath | 359/514 |
| 4,052,525 | 10/1977 | Ide et al. | 428/412 |
| 4,341,837 | 7/1982 | Katsuto et al. | 428/336 |
| 4,511,210 | 4/1985 | Tung et al. | 359/538 |
| 4,653,854 | 3/1987 | Miyata | 359/538 |
| 4,897,136 | 1/1990 | Bailey et al. | 156/145 |
| 4,983,436 | 1/1991 | Bailey et al. | 428/40 |
| 5,064,272 | 11/1991 | Baily et al. | 359/541 |
| 5,066,098 | 11/1991 | Kult et al. | 359/540 |
| 5,318,839 | 6/1994 | Arai et al. | 428/329 |
| 5,338,595 | 8/1994 | Li | 359/538 |
| 5,357,014 | 10/1994 | Uchida et al. | 526/347 |
| 5,369,136 | 11/1994 | Park et al. | 521/143 |
| 5,378,520 | 1/1995 | Nagaoka et al. | 359/538 |
| 5,387,620 | 2/1995 | Park et al. | 521/143 |
| 5,601,915 | 2/1997 | Ochi et al. | 428/323 |

FOREIGN PATENT DOCUMENTS

| | | |
|---|---|---|
| 0225103 | 6/1987 | European Pat. Off. ........ 359/530 |
| 40-7870 | 4/1965 | Japan . |
| 54-83393 | 7/1979 | Japan . |
| 0078102 | 5/1983 | Japan ................ 359/538 |
| 59-71848 | 4/1984 | Japan . |
| 59-36645 | 9/1984 | Japan . |
| 59-198402 | 11/1984 | Japan . |
| 60-67902 | 4/1985 | Japan . |
| 60-194405 | 10/1985 | Japan . |
| 61-13561 | 4/1986 | Japan . |
| 62-121043 | 6/1987 | Japan . |
| 2196653 | 8/1990 | Japan . |

*Primary Examiner*—Paul M. Dzierzynski
*Assistant Examiner*—Mohammad Y. Sikder
*Attorney, Agent, or Firm*—Sherman and Shalloway

[57] ABSTRACT

A method for making retroreflective sheeting comprising the steps of placing a light-transmittable protective film on glass beads in a support sheet which consists of a binder layer and a reinforcing layer, and which is provided with retroreflective glass beads embedded in the binder layer, and thermoforming parts of the support sheet under heating and pressure so as to partially bond the binder layer of the support sheet to the protective film, which is characterized in that the reinforcing layer of the support sheet consists of a crosslinkable resin having shearing stress S in the range of $6 \times 10^6 - 1.2 \times 10^7$ dyne/cm² before the thermoforming. A retroreflective sheeting made by this method has a high uniformity of the joint portions of the support sheet and protective film. Even when this retroreflective sheeting is used outdoors for a long period of time, troubles including peeling-off of the protective film do not substantially occur. This retroreflective sheeting can be utilized extensively as a road sign board, a license plate for a vehicle, a sign board for construction work and an advertisement board.

16 Claims, 2 Drawing Sheets

METHOD FOR MAKING RETROREFLECTIVE SHEETING

This application is a national phase application claiming rights and benefit from International Application PCT/JP92/01407, filed Oct. 30, 1992.

FIELD OF TECHNOLOGY

This invention relates to a method for making retroreflective sheeting which is useful for road signs, number plates on vehicles such as automobiles, motorcycles, etc., construction signs and marking of sign boards and the like.

BACKGROUND TECHNOLOGY

Retroreflective sheeting which retroreflexes light towards the light source is well known in the past. Utilizing its retroreflectivity, the sheeting has been widely used in the field of road signs, number plates of vehicles, construction signs, display marking such as sign boards and the like.

In particular, such retroreflective sheetings which are normally referred to as cellular or encapsulated lens-type reflective sheeting, whose light-retroreflective performance is enhanced by utilizing low refractive index of air, are finding yearly increasing utility because of their excellent light-retroreflective ability.

Generally a cellular reflective sheeting is composed of a protective film and a support sheet which face each other across a narrow air layer, and mutually intersecting, reticular joint portions which are formed by thermally deforming a part of said support sheet to bond said two, the cellular spaces between the protective film and the support sheet, which are partitioned by said reticular joint portions, encapsulating a large number of retroreflective glass beads which are partially embedded in the support.

Retroreflective performance of a cellular reflective sheeting with such a structure almost exclusively relies on the cellular portion and the reticular joint portions make substantially, no contribution to said performance. In consequence, it is important for the sheeting to exhibit still higher retroreflective performance, that the areal ratio occupied by the joint portions per unit surface area of the retroreflective sheeting is reduced to the possible minimum.

When the areal ratio of the joint portions is reduced, i.e., when the bonded area of the joint portions between the protective film and the support sheet is reduced, however, there arises the problem that frequently deterioration in strength of the joint portions themselves or insufficient bonding strength results, causing a peeling-off trouble of the protective film from the support sheet.

Accordingly, attempts have been made to possibly reduce the area of the joint portions and to increase the bonding strength between the protective film and support sheet. For example, Japanese Patent Publication No. 1356/1986 (U.S. Pat. No. 4,025,159) has proposed "a process for making a retroreflective sheeting which comprises (a) preparing a base sheet on one surface of which a layer of a retroreflective elements is provided, and (b) forming a network of narrow intersecting bonds by thermoforming a binder material and contacting it with at least either one of a cover sheet or said base, whereby to bond the cover sheet as spaced from the layer of the retroreflective elements, said method being characterized by the steps of thermoforming a thermoformable and radiation-curable binder material and forming said network, and thereafter curing the network in situ by radioactive rays applied thereto to an insoluble and infusible state, whereby increasing the bonding strength of the network of bonds with the sheet".

According to our reconstruction of above-proposed method, however, it has been found that the interfacial bonding strength between the joint portions of the substrate sheet and the protective film is not appreciably improved by the radiation curing, while strength of the joint portions does increase. Furthermore, because the substrate sheet which is used in the above-proposed method is thermoplastic before the thermoforming (radiation curing is practiced after thermoforming), it is in the state highly susceptible to fluidization at the time of thermoforming, and the width or thickness of the joint portions are apt to fluctuate according to fluctuation in local thickness in the protective film or substrate sheet, or according to slight changes in thermoforming conditions. Hence it is difficult to obtain stable configuration of the joint portions and, in consequence, stable bonding strength between the protective film and the substrate sheet. Furthermore, according to our studies, the curing reaction after the thermoforming (after the formation of joint portions) produces volume contraction, i.e., strain, in the joint portions, which is detrimental to the bonding strength between the protective film and substrate sheet.

Japanese Laid-open Patent Application, KOKAI No. 121043/1987 (U.S. Pat. Nos. 4,007,136 and 5,064,272) has proposed a "method of making encapsulated lens-type retroreflective sheeting which comprises the steps; (i) partially embed substantially a monolayer of lenses into a carrier web; (ii) deposit specularly reflecting material over the lens-bearing surface of the carrier web; (iii) apply heat and pressure to contact a HMW thermoplastic binder film with portions of the specularly reflecting deposit which are on lenses, without contacting any portion of the specularly reflecting deposit which is on the surface of the carrier web between lenses; (iv) strip off the carrier web; (v) lay a cover film over the exposed lenses; and (vi) apply heat and pressure along a network of interconnecting lines to soften and deform the binder material into contact with the cover film, thus forming hermetically sealed cells within which the lenses are encapsulated and have an air interface".

The proposed method aims at improvement in the joint portions by the use of a thermoplastic binder film having a melt index of no more than 750 as the support sheet.

According to the result of our reproduction test, however, although the binder film is a thermoplastic film having a low melt index, it is apt to become fluidable during thermoforming similarly to the previous proposal, and whereby shape variation in the joint portions is caused. Thus we found that the method is subject to a problem that stable shape of the joint portions is difficult to be secured. Furthermore, according to the proposed method, fusibility of the thermoplastic film at its contacting portions with the protective film deteriorates when the former's melt index is drastically reduced, and the wettability at the interface of the protective film and the joint portions becomes insufficient, which results in decrease in interfacial bonding strength between the protective film and the joint portions.

As a means to improve strength of the joint portions without impairing wettability at the interface of the protective film and joint portions, it has also been proposed to give the support sheet a two-layered structure. For example, Japanese Laid-open Patent Application, KOKAI No. 194405/1985 (U.S. Pat. No. 4,653,854) has disclosed "reflex-reflecting sheeting in which a monolayer of glass beads are supported by a support film made of a synthetic resin, as their approximately the lower hemispheres which are covered with vacuum evaporation-deposited metal coating are embedded in said support film, and a large number of hermetically sealed small compartment cells separated by a continuous linear connecting wall, which is formed by partial thermoforming of the support film, are formed between a transparent protective film made of a synthetic resin, which is provided on the exposed glass beads surface side, and said support film, said sheeting being characterized in that said support film comprises at least an upper layer coming into contact with the glass beads and a lower layer on the opposite side, said upper layer having greater adhesive power to the protective film than that of the lower layer and the lower layer having a greater cohesive force than that of the upper layer, having each a different composition". Furthermore, Japanese Laid-open Patent Publication KOKAI No. 196653/1990 has disclosed a "retroreflective sheeting which comprises a binder layer in which a monolayer of glass beads are embedded to approximately the lower hemispheres which are coated with vacuum evaporation coated metal membrane, and a support layer which is provided on the opposite side of the glass beads and in contact with the binder layer; in the space between a transparent protective film made of synthetic resin which is placed on the side of the exposed glass beads and said binder layer a large number of sealed, small compartment cells each isolated by a continuous, linear binding wall which is formed by partial thermoforming of the support film being constructed, characterized in that said binder layer is formed mainly from a thermoplastic resin comprising a resin having a glass transition temperature not higher than 35° C. and a high bonding strength with the protective film, and an elastomer which has an elongation at normal temperature of at least 50% and a tensile strength at 70° C. of at least 120 kg/cm$^2$; and in that the support layer is formed mainly from a hardenable resin".

It is not intended with these retroreflective sheetings, however, to make the shearing stress S of the support sheet before thermoforming (in particular, the shearing stress S of the reinforcing layer which corresponds to the lower layer of the above disclosed reflective sheetings) constant, whereby to obtain stable shape of the joint portions and stable bonding strength between the protective film and the support sheet. In consequence, the support sheet is rendered relatively thermofluidable, such as in semi-crosslinked state, before thermoforming. As aforesaid, stable shape of joint portions can hardly be obtained under such condition.

Furthermore, in the above-disclosed reflective sheetings, crosslinkage is advanced after the support sheet has been thermoformed, whereby causing volume contraction, i.e., strain, at the joint portions which adversely affects the bonding strength between the protective film and the support sheet.

An object of the present invention is to eliminate those defects in conventional technology and to provide a method which enables stable and easy manufacture of cellular retroreflective sheeting in which the bonding strength between the protective film and the support sheet is high.

We have discovered that it is an important factor for preventing peeling-off trouble of the protective film in prolonged outdoor use of cellular reflective sheeting, to prevent local variation of bonding strength which is caused by variation in local configuration of the joint portions, while it is of course necessary to accomplish an overall improvement in bonding strength between the protective film and support sheet by improving the interfacial adhesive strength between the protective film and the joint portions of support sheet as well as the strength of the joint portions themselves.

That is, when spots of low adhesive strength exist due to variation in shape of joint portions, the stress caused by strain is exerted on such spots at relatively higher concentration, to destruct adhesion between the protective film and support sheet at said spots within relatively short time. Subsequently, peeling of the protective film starts from the destructed spots and progresses consecutively, to eventually cause serious peeling-off troubles of the protective film. Therefore, even though the adhesion strength between the protective film and support sheet as a whole is excellent, when locally weak spots are present, the spots are apt to become the cause of peeling-off troubles of the protective film.

Accordingly, for preventing occurrence of such troubles, it is important to possibly uniformize the adhesion strength between the protective film and support sheet over the whole sheeting. For this purpose it is the matter of extreme importance to render the shape of the joint portions connecting the protective film and the support sheet as uniform and constant as possible.

We have made extensive studies to accomplish the uniformization (making constant) of shape of the joint portions, to discover that the aim can be achieved with relative ease, when the support sheet is given a two-layered structure composed of a binder layer and a reinforcing layer, and the reinforcing layer is formed from crosslinkable resin having a shearing stress S before thermoforming within a range of $6 \times 10^6 - 1.2 \times 10^7$ dyne/cm$^2$. The present invention has thus been completed.

DISCLOSURE OF THE INVENTION

According to the invention, therefore, a method for making a retroreflective sheeting is provided, which comprises placing a light-transmittable protective film on glass beads in a support sheet which is composed of a binder layer and a reinforcing layer, in said binder layer substantially a monolayer of said retroreflective glass beads being embedded in such a manner that at least the non-reflective parts of said glass beads are exposed, and partially thermoforming said support sheet under heating and at an elevated pressure to partially bond the binder layer of the support sheet to the protective film, said method being characterized in that said reinforcing layer of the support sheet is composed of a crosslinkable resin having a shearing stress S within a range $6 \times 10^6 - 1.2 \times 10^7$ dyne/cm$^2$ before the thermoforming.

Hereinafter the method of the present invention is explained in further details, referring to the production flow charts as indicated in FIGS. 1(a)–1(d) and 2(a)–2(d).

Figure 1A:
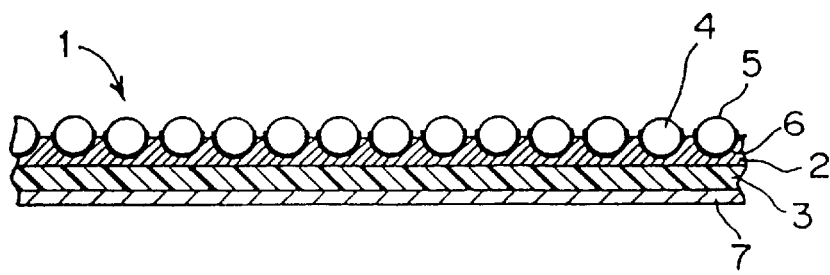
FIG. 1(a) is a type cross-sectional view of a representative support sheet of the present invention.

A support sheet (1) to be used in the present invention has, as illustrated in FIG. 1(a), essentially the construction that it is composed of a binder layer (2) and a reinforcing layer (3), in said binder layer (2) substantially a monolayer of retroreflective glass beads (4) being embedded with at least their non-reflective portions (5) exposed. In FIG. 1(a)–1(d), both the binder layer and the reinforcing layer are illustrated as each being composed of a single layer, but the binder layer and/or reinforcing layer may be composed of plural layers of either identical or different composition.

If necessary, the reinforcing layer (3) may be laminated with a provisional protective layer (7) on the surface opposite to the binder layer (2), said provisional protective layer (7) being composed of a release treated polyethylene terephthalate film, resin-coated process paper, fluorinated film or the like, for protecting the reinforcing layer from adhesion with heated embossing roll during the thermoforming.

One of the characteristic features of the present invention resides in that the reinforcing layer constituting the support sheet is formed of a crosslinkable resin having a shearing stress S within a range $6 \times 10^6$–$1.2 \times 10^7$ dyne/cm$^2$, preferably $7 \times 10^6$–$1.1 \times 10^7$ dyne/cm$^2$, more preferably $8 \times 10^6$–$1.0 \times 10^7$ dyne/cm$^2$, before the thermoforming. Here the "shearing stress S" is the value measured by the flow test method as described in JIS K-7199. When the shearing stress S of a crosslinkable resin forming the reinforcing layer exceeds $1.2 \times 10^7$ dyne/cm$^2$, the reinforcing layer becomes undesirably hard, and the pressing force exerted on the binder layer through the reinforcing layer during thermoforming is dispersed, rendering it difficult to obtain stable shape of the joint portions with uniform width, thickness, etc. Whereas, when the shearing stress S of said crosslinkable resin is less than $6 \times 10^6$ dyne/cm$^2$, the reinforcing layer becomes exceedingly soft and is itself markedly deformed under the pressing force exerted during the thermoforming, rendering it difficult to obtain uniform and stable shape of the joint portions. Such, therefore, are undesirable.

Crosslinkable resins which are useful for making the reinforcing layer include both internal crosslinking type resins which are self-crosslinkable under radiation of active rays such as ultraviolet rays, electron rays, etc., heating, or by action of a catalyst; and external crosslinking type resins which are crosslinkable by concurrent use of a crosslinking agent, such as polyisocyanate compounds, melamine formaldehyde resins or derivatives thereof, epoxy compounds or derivatives thereof, chelate compounds of such metals as aluminum, titanuim, etc. More specifically, as examples of internal crosslinking type resins the following may be named: combinations of at least two resins each having, as crosslinkable functional groups, carboxyl, methylol, amide, amino, glycidyl or the like, said resins reacting complementarily [for example, methyl methacrylate (MMA)—ethyl acrylate (EA)—acrylic acid (AA) copolymer as combined with methyl methacrylate (MMA)—ethyl acrylate (EA)—glycidyl methacrylate (GMA) copolymer; methyl methyacrylate (MMA)—ethyl acrylate (EA)—acrylamide (AMD) copolymer as combined with methyl methacrylate (MMA)—ethyl acrylate (EA)—glycidyl methacrylate (GMA) copolymer], or low molecular weight compounds or high molecular weight resins having terminal active double bonds (for example, ethylene glycol diglycidyl ether diacrylate compound, diethylene glycol diglycidyl ether dimethacrylate compound, triethylene glycol diglycidyl ether dimethacrylate, polyethylene glycol dimethacrylate, diethylene glycol diacrylate, tetraethylene glycol diacrylate, etc.). Also as the external crosslinking type resins, for example, such copolymers as methyl methacrylate (MMA)—ethyl acrylate (EA)—acrylic acid (AA) methyl methacrylate (MMA)—ethyl acrylate (EA)—itaconic acid (IA), methyl methacrylate (MMA)—ethyl acrylate (EA)—2-hydroxyethyl methacrylate (2-HEMA) may be named.

Such crosslinkable reins as above may be blended, if necessary, with each an ordinary amount of an extender or coloring pigment such as titanium oxide, magnesium oxide, calcium carbonate, barium sulfate, chrome yellow, Cyanine Blue, Cyanine Green, or the like; ultraviolet-absorbing agent (e.g., benzotriazole-containing absorbers, benzophenone-containing absorbers, cyanoacrylate-containing absorbers, etc.), photo, stabilizer (e.g., hindered amine-containing photostabilizers, hindered phenol-containing photostabilizers, etc.), stabilization promotors such as antioxidant (e.g., phenolic antioxidants, phosphite-containing antioxidants, thioether-containing antioxidants, etc.); and other additives. Further, if necessary, the shearing stress S or other characteristic properties of those crosslinkable resins may be adjusted by blending an adequate amount of thermoplastic resin, for example, acrylic resin, polyurethane resin, polyester resin, fluorine-containing resin, vinyl acetate resin, vinyl chloride resin, polyolefin resin, etc.

Thickness of the reinforcing layer is not subject to strict limitation, but is variable over a wide range depending on the construction material of the reinforcing layer, utility of the final product, etc. Generally it is convenient to select it within a range of 5–100 $\mu$, preferably 10–70 $\mu$, still more preferably 20–50 $\mu$.

Crosslinking reaction of the crosslinkable resins constituting the reinforcing layer should desirably be substantially complete prior to the later described thermoforming. In such a case, the crosslinkable resin whose crosslinking reaction has substantially been completed must have a shearing stress S within the aforesaid range. Accordingly, when an internal crosslinking type resin is used, it is necessary to control the shearing stress S of the resin which has completed its crosslinking reaction to fall within the above-specified range by, for example, adjusting the content of crosslinkable functional groups in said resin, selecting suitable kind of crosslinkable functional groups, varying the ratio of combination of two or more crosslinkable functional groups. When an external crosslinking type resin is to be used, similar control is necessary by, for example, selection of kind of resin and/or the crosslinking agent, quantitative adjustment of the crosslinking agent, adjustment of the crosslinking reaction conditions, etc.

Incidentally, whether the crosslinking reaction of the crosslinkable resin is complete or not can be confirmed by such means as, for example, measurement of elongation, strength, modules of elasticity, flowability, etc. of the shaped product; determination of insoluble or soluble component using an organic solvent; analysis of molecular construction by infrared spectral analysis, NMR analysis or the like.

Whereas, the binder layer is for adhering and fixing the retroreflective glass beads in above-described reinforcing layer and for bonding a later described protective film with the reinforcing layer. While its construction material is subject to no particular limitation, generally a non- or low-crosslinkable resin or their mixture is used. In particular, mixtures of non-crosslinkable resin and low-crosslinkable resin are preferred. As the low-crosslinkable resin, use of multi-stage polymerizing, internal crosslinking type resin is preferred.

The binder layer is less susceptible to the influence of heat than the reinforcing layer during the thermoforming. In consequence, shearing stress S of the resin constituting the binder layer is not so strictly limited as that of the reinforcing layer, but it is generally convenient for the binder layer-forming resin to have a shearing stress S, before the thermoforming, within the range of $2 \times 10^5$–$1.5 \times 10^6$ dyne/cm$^2$, preferably $3 \times 10^5$–$1.3 \times 10^6$ dyne/cm$^2$, still more preferably $4 \times 10^5$–$1.0 \times 10^6$ dyne/cm$^2$.

While a retroreflective sheeting is cut to an adequate size suitable for individual utility, the cut edges are apt to be detrimental to the retroreflective performance as water or moisture infiltrate through the edges. Also the joint portions at the edges are the easiest to be destructed and tend to serve as the starting points of peeling of the protective film. Accordingly, it is desirable to seal the cut edges of reflective sheeting in advance (edge seal) by hot pressing or a like means. For this purpose, the resin forming the binder layer of the support sheet preferably exhibits fusibility after thermoforming and retains a shearing stress S of at least no more than $2\times10^6$ dyne/cm$^2$, more preferably no more than $1.5\times10^6$ dyne/cm$^2$, still more preferably within the range $2\times10^5$–$1.5\times10^6$ dyne/cm$^2$.

As the binder layer-constituting resin, non- or low-crosslinkable resins or their mixtures can be used as already stated. As non-crosslinkable resins, for example, thermoplastic reins selected from acrylic, alkyd, polyurethane, polyester, epoxy, vinyl chloride, vinyl acetate, polyolefin and polyamide-type resins may be named, which can be used each singly or as blends of two or more.

The low-crosslinkable resins include such resins as above-named, into which self-crosslinkable functional groups or those crosslinkable as assisted by a crosslinking agent as earlier described have been introduced. Here "low crosslinkability" signifies such level of crosslinkage exhibiting a fusibility sufficient to allow sealing with hot pressing or the like and being relatively solvent-soluble, more specifically, when the resin is immersed in tetrahydrofuran solvent at 25° C. for 12 hours and the insoluble component is separated and determined, such that the insoluble component is about 15% by weight or less.

A particularly preferred embodiment of the binder layer-constituting resin is a mixture of non-crosslinkable resin and low-crosslinkable resin. The mixing ratio is not strictly limited, but normally it is preferred to mix them within the ratio of 50–90% by weight of non-crosslinkable resin to 10–50% by weight of low-crosslinkable resin, more preferably 60–80% by weight of the former to 20–40% by weight of the latter. Furthermore, as the low-crosslinkable resins to be used in the mixtures, multi-stage polymerization type internal crosslinking resins are particularly preferred.

In the present specification, said "multi-stage polymerization type internal crosslinking resins" include composite resin in which each different polymer layers are sequentially formed around a core, center polymer. It is a resin having a multi-layered structure obtained by multi-stage polymerization, its basic structure unit being a two layered structure whose innermost layer polymer 1 as the core has a Tg of at least 10° C. and the outermost layer polymer 2 has a Tg of at least 50° C., optionally having between said innermost layer polymer 1 and the outermost layer polymer 2 many intermediate layers of Tg ranging −50° C.–50° C . Any and all two layers therein are intimately bonded by grafting, and in each of the layers excepting the outermost layer the respective internal crosslinking reaction has occurred at the polymerization time. Examples of such resins are disclosed in, e.g., Japanese Patent Publication No. 36645/1984 (U.S. Pat. No. 4,052,525).

When low-crosslinkable resin is used to form the binder layer, preferably its crosslinking reaction should be substantially complete before the thermoforming treatment, similar to the case of the reinforcing layer.

If necessary, additives such as an extender pigment, coloring pigment, ultraviolet absorber, photo stabilizer, antioxidant, etc. may be added to the binder layer, as has been explained as to the reinforcing layer, and also such promoters as a fluorescent brightening agent (e.g., imidazole derivative, diaminostilbenedisulfonic acid derivative, coumarin derivative, imidazolone derivative, etc.) may be adequately added.

Thickness of the binder layer is again not strictly limited, but is variable over a wide range depending on the kind of resin forming the binder layer, size of the glass beads, etc. Generally, however, it is convenient to design it within a range 20–200 $\mu$, preferably 30–150 $\mu$, still more preferably 50–100 $\mu$.

The retroreflective glass beads to be embedded in this binder layer are those having a refractive index of 1.7–2.0, in particular, around 1.91, and an average particle diameter of normally 30–100 $\mu$, in particular, 40–90 $\mu$, whose approximately the lower hemispheres (the parts indicated with reference number 6 in FIG. 1) are mirror plane-treated by, e.g., vacuum evaporation deposition of metals such as aluminum, silver, iron, gold, chrominum, titanium, copper, zinc, nickel, etc. or their alloys.

Figure 1B:
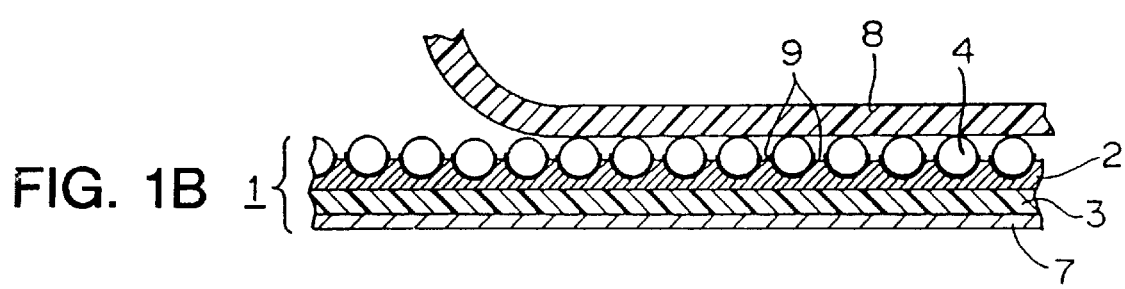
FIGS. 1(b), 1(c) and 1(d) are schematic type cross-sectional views 1(b), 1(c) and 1(d) illustrating a typical method for making a retroreflective sheeting using this support sheet.

As so far explained, on the glass beads (4) in the support sheet (1) as illustrated in FIG. 1(a), as indicated in FIG. 1(b), a light-transmittable protective film (8) is superposed, while avoiding any contact of the binder layer surface (9) between the glass beads (4) with said protective film.

The light-transmittable protective film used here is subject to no special limitation as to its construction material, so long as it has a total light transmittance of at least 20%, preferably at least 40%, and some pliability. For example, any of acrylic resin film, fluorine-containing resin film, polyurethane resin film, vinyl chloride resin film, polycarbonate resin film, polyester resin film, polyolefin resin film, etc. may be used. Of those, films excelling in weatherability are preferred. Fluorine-containing resin film exhibits very high weatherability and is particularly preferred as the protective film for the reflective sheeting which is used in outdoors for a prolonged period.

It is generally preferred that such protective film be non-stretched. Because, while monoaxially or multiaxially stretched film exhibits higher mechanical strength, strain remains therein.

When a protective film has insufficient adhesive ability to the binder layer of above-described support sheet, it is desirable to treat its surface facing the binder layer in advance to improve its adhesive property. As such adhesive property-improving treatment, any means known per se may be employed, e.g., corona discharge, plasma discharge, plasma-coating treatments, etc. Of those, corona discharge is preferred, as it is relatively easy of operation and can achieve excellent effect.

Thickness of the protective film is variable over a wide range depending on the intended use of the reflective sheeting, while normally it ranges 20–200 $\mu$, preferably 40–150 $\mu$, more preferably 50–100 $\mu$.

The protective film (8) as superposed on the support sheet (1) as illustrated in FIG. 1(b), while maintaining the superposed state, are then heated under an elevated pressure to partially thermoform the support sheet (1) to cause partial adhesion of its binder layer (2) with the protective film (8).

Figure 1C:
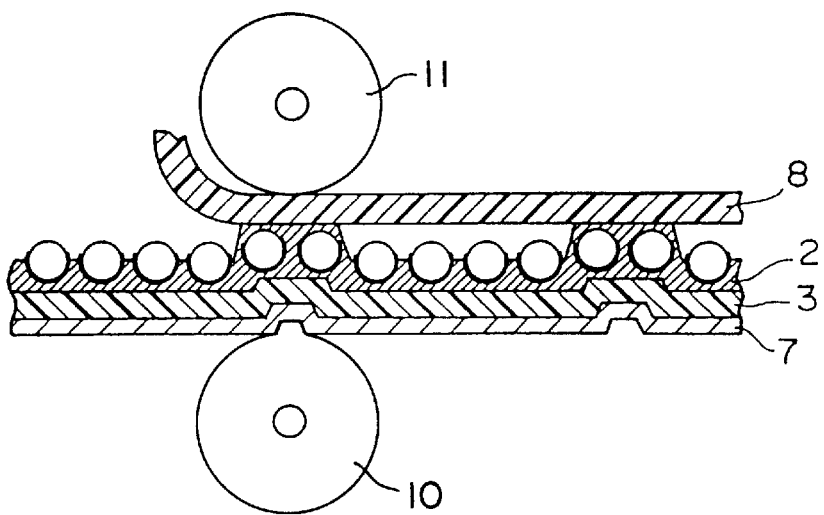

This thermoforming is practiced, as indicated in FIG. 1(c), by such a method by passing the superposed system through a clearance of a constant width between an embossing roll (10) which has on its surface, for example, a network of projections and which is a metal roll heated to be given a surface temperature of normally 100°–250° C., preferably 150°–230° C., more preferably 170°–200° C.; and a press roll (11) such as a rubber roll heated to a temperature in a range from normal temperature to 100° C. , preferably about 40°–about 90° C., more preferably about 50°–about 80° C.; while rotating said two rolls. It is adequate to so adjust the clearance between the two rolls that the space between the projections on the embossing roll and the press roll should be less than the total thickness of the superposed system, and that between the depressions on the embossing roll and the press roll should be more than the total thickness of the superposed system.

Figure 1D:
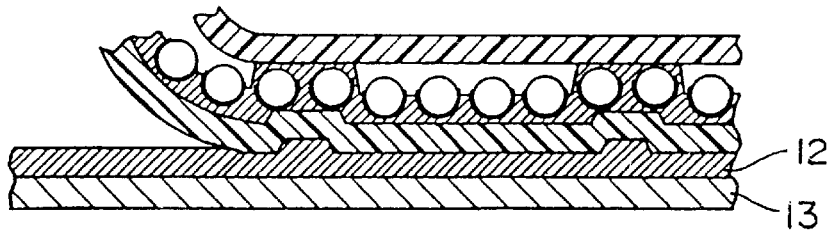

The sheet after said thermoforming is, either as it is or after stripping off therefrom a provisional protective layer (7) when used, stuck together with an adhesive layer (12) as indicated in FIG. 1(d), said adhesive layer having been formed by coating a release base (13) such as a silicone-treated release film, with an adhesive solution and drying the same. Whereupon the retroreflective sheeting is completed.

Figure 2A:
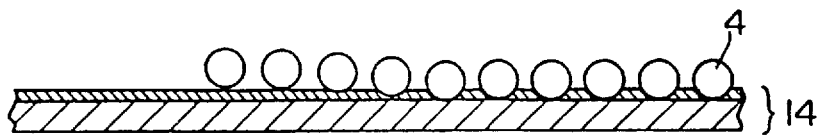
FIGS. 2(a), 2(b), 2(c) and 2(d) are schematic type cross-sectional views illustrating a typical method for making a support sheet of the present invention.

The support sheet (1) as illustrated in FIG. 1(a), which is used in the method of the present invention as described above can be made through the production steps as illustrated in FIG. 2a)–2(d).

First, as in FIG. 2(a), on a sheet of, for example, polyethylene film/paper laminated process paper (14) whose polyethylene film has been softened by heating at about 110° C., glass beads (4) are densely scattered as substantially a monolayer, and pushed into said polyethylene film with a nip roll, etc., to embed the glass beads into the polyethylene film to about ⅓–½ of the diameter of said glass beads.

Figure 2B:
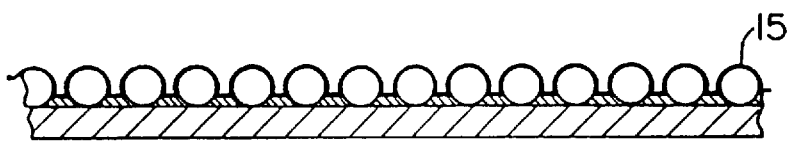

Then, as indicated in FIG. 2(b), on the glass beads-bearing surface, which is to serve as the photo-reflective portion, a metal such as aluminum is vapor coated by such a method as vacuum evaporation deposition, to provide a photo-reflective membrane (15) for forming photo-reflective portion.

Figure 2C:
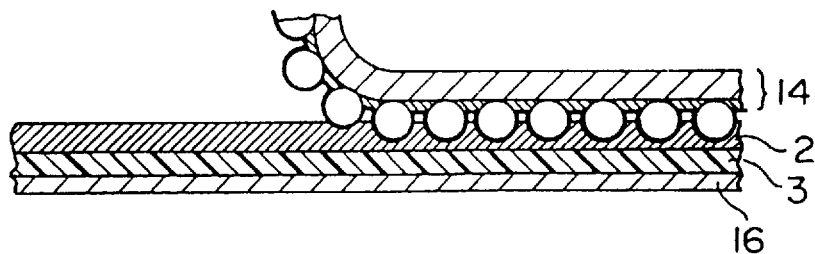
Figure 2D:
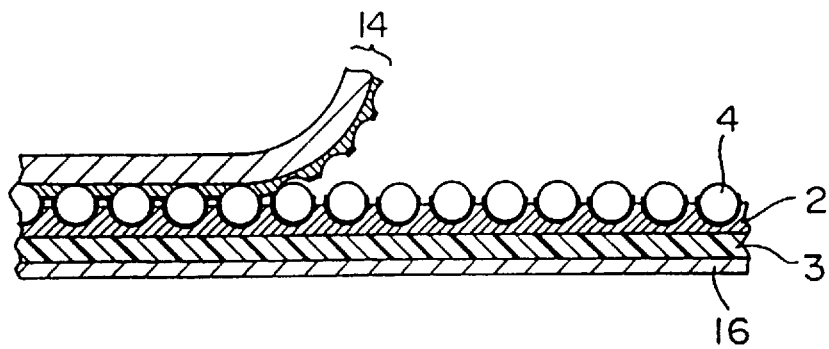

Subsequently, as indicated in FIG. 2(c), on a laminate having a reinforcing layer (3) and a binder layer (2) which were formed in advance on a process film (16) like a polyethylene terephthalate film whose surface has been treated with, for example, a silicone-type release treating agent, by solution coating or like means, the sheet as prepared in FIG. 2(b) is superposed with its photo-reflective membrane (15)-coated side (vacuum-deposited metal side) facing the binder layer (2). While applying heat, if necessary, to soften the binder layer, the glass beads are pushed into the binder layer with a nip roll or the like, to embed them to about ⅓–½ of their diameters. In that occasion, it is preferred to push the beads into the binder layer leaving a narrow space between the photo-reflective membrane (vacuum-deposited metal membrane) on the polyethylene and the surface of the binder layer, so as to avoid contact and transfer of the photo-reflective membrane (vacuum-deposited metal membrane) on the polyethylene film, with and to the binder layer. While the pushing pressure in that occasion is variable depending on the shearing stress S of individual binder layer, temperature at that time, etc., normally it is convenient to practice the operation, under pressure of approximately 1–2 tons per meter of the nip roll.

The laminate of the reinforcing layer (3) and binder layer (2) can be prepared by, for example, first coating a reinforcing layer resin solution on said process film (16), drying, and coating the top thereof with a binder layer resin solution and drying; or separately formed reinforcing layer and binder layer through such coating and drying may be stuck together to form the laminate. Said process film (16) may be peeled off, if necessary, or left in situ to be utilized as a provisional protective layer (7). Finally, upon peeling the laminated process paper (14) off, a support sheet (1) of the present invention is obtained.

EXAMPLES

Hereinafter the present invention shall be explained still more specifically, referring to working examples.

Example 1

A process paper, which was formed by laminating an about 20 $\mu$-thick polyethylene resin layer on a sheet of paper, was heated to about 105° C., and on which glass beads having an average particle diameter of about 65 $\mu$ and a refractive index of about 1.91 were uniformly and densely dispersed, pressed with a nip roll and embedded in said polyethylene resin layer to about ⅓ of their diameter.

Then on the glass beads-embedded surface of the process paper, aluminum was vacuum-deposited to a thickness of about a 0.1 $\mu$, using a vacuum evaporator.

Next a solution mixture of 100 parts by weight of a methyl isobutyl ketone/toluene (1/1) solution of methyl methacrylate (MMA)—ethyl acrylate (EA)—2-hydroxyethyl methacrylate (2-HEMA) copolymer (composition ratio by weight: MMA/EA/2-HEMA=20/65/15; solid component=50%) and 14.2 parts by weight of 1-methoxypropyl acetate-2/xylene (1/1) solution (solid component=75%) of hexamethylene diisocyanate crosslinking agent was coated on a silicone-treated polyethylene terephthalate film, and dried to form a 40 $\mu$-thick reinforcing layer.

Further on said reinforcing layer a solution prepared by mixing an acrylic resin solution A which was obtained by mixing 100 parts by weight of a methyl isobutyl ketone/toluene (1/1) solution of methyl methacrylate (MMA)—ethyl acrylate (EA)—2-hydroxyethyl methacrylate (2-HEMA) copolymer (composition ratio by weight: MMA/EA/2-HEMA=40/55/5; solid component=40%) with 30 parts by weight of titanium oxide; 10 parts by weight of methyl isobutyl ketone solution B (solid component=20%) of methyl methacrylate (MMA)—butyl acrylate (BA)—styrene (St) copolymer (multi-stage polymerization type, internal crosslinking resin); and 13 parts by weight of a methyl isobutyl ketone solution (solid component=15%) of cellulose acetate butyrate resin; was applied and dried to form an about 80 $\mu$-thick binder layer. Whereupon a reinforcing layer-binder layer laminate was obtained.

Then the laminate was superposed on the vacuum deposited aluminum side of the glass beads-embedded process paper, with its binder layer side down, and pressed to embed the glass beads in the binder layer to about ⅓. Thereafter the system was aged at 35° C. for 14 days to substantially complete crosslinking of the reinforcing layer. Shearing stress S of the reinforcing layer and that of the binder layer was measured. The results were that the shearing stress S of the reinforcing layer was 9.48×10$^6$ dyne/cm$^2$, and that of the binder layer was 4.78×10 dyne/cm$^2$.

Then the polyethylene resin laminated process paper was stripped off from the laminate, and on the whereby exposed glass beads, an about 75 $\mu$-thick, non-stretched acrylic film (produced by Mitsubishi Rayon K.K.) having a total light transmittance of about 93% was superposed, and together passed through a clearance between a metal roll having a network embossed carving with line width of 0.3 mm and a surface temperature of about 190° C., and a rubber roll having a surface temperature of about 60° C., the acrylic film side contacting the rubber roll, while exerting pressure, to effect thermoforming. Here again shearing stress S of the reinforcing layer and the binder layer was measured. The results were not much different from the shearing stress values measured before the thermoforming, as to both the reinforcing layer and the binder layer.

The silicone-treated polyethylene terephthalate film was removed from the thermoformed product, and an about 40 µ-thick acrylic adhesive (KP-997 produced by Nippon Carbide Kogyo K.K.) was laminated on the reinforcing layer to provide a retroreflective sheeting. Thus obtained sheeting excelled in shape uniformity of the joint portions and also in peeling resistance of the protective film, as indicated in later-appearing Table 1. Furthermore, the resultant sheeting could be heat sealed at the edges.

Comparative Example 1

A retroreflective sheeting was prepared in the identical manner with Example 1, except that the amount added to the reinforcing layer of hexamethylene diisocyanate crosslinking agent was 5.0 parts by weight. The shearing stress S of the reinforcing layer before the thermoforming was $5.31 \times 10^6$ dyne/cm$^2$.

Thus obtained retroreflective sheeting showed excessive oozing out at the joint portions and, consequently, poor reflective performance, failing to achieve the object of the present invention, as indicated in later appearing Table 1. The product was also inferior in peeling resistance of the protective film after the weatherability test.

Comparative Example 2

A cellular reflective sheeting was prepared in the identical manner with Example 1, except that the amount added to the reinforcing layer of the isocyanate crosslinking agent was 25.0 parts by weight. The shearing stress S of the reinforcing layer before the thermoforming was $1.25 \times 10^7$ dyne/cm$^2$.

The resultant retroreflective sheeting showed excessive oozing out at the joint portions and, consequently, poor reflective performance, failing to achieve the objects of the present invention, as indicated in the later appearing Table 1.

Comparative Example 3

A retroreflective sheeting was prepared in the identical manner with Example 1, except that the aging at 35° C. was omitted. The shearing stress S of the reinforcing layer before the thermoforming was $5.48 \times 10^6$ dyne/cm$^2$.

Thus obtained retroreflective sheeting had partial variations in line width of the joint portions, was inferior in the initial strength and peeling resistance of the protective film after the weatherability test as indicated in later appearing Table 1, and could not achieve the objects of the present invention. Furthermore, fine creases appeared in the glass beads-embedded surface of the support sheet of the resultant retroreflective sheeting, rendering the product unfavorable also in appearance.

Example 2

A retroreflective sheeting was prepared in the identical manner with Example 1, except that the protective film was changed to a vinylidene fluoride film (DX film produced by Denki Kagaku Kogyo K.K.). The resulting reflective sheeting excelled in uniformity in shape of the joint portions as well as in peeling resistance of the protective film as indicated in later appearing Table 1, satisfying the objects of the present invention.

Example 3

A retroreflective sheeting was prepared in the identical manner with Example 1, except that the acrylic resin solution A forming the binder layer was changed to an acrylic resin solution obtained by mixing 57 parts by weight of a toluene/ethyl acetate (7/3) solution (solid component: 30%) of a non-crosslinkable methyl methacrylate (MMA)—ethyl acrylate (EA) copolymer (composition ratio by weight: MMA/EA=46/54); 43 parts by weight of a toluene/ethyl acetate (6/4) solution (solid component: 40%) of a crosslinkable methyl methacrylate (MMA)—ethyl acrylate (EA)—acrylic acid (AA) copolymer (composition ratio by weight: MMA/EA/AA=33/66/1); and 17 parts by weight of titanium oxide; and that such acrylic resin solution A was mixed with 34 parts by weight of a methyl isobutyl ketone solution B (solid component: 20%) of a methyl methacrylate (MMA)—butyl acrylate (BA)—styrene (St) copolymer (a multi-stage polymerization type internal crosslinking resin) and 12 parts by weight of a methyl isobutyl ketone solution (solid component: 15%) of a cellulose acetate butyrate resin.

The resulting reflective sheeting excelled in uniformity in shape of the joint portions as well as in peeling resistance of the protective film as indicated in later appearing Table 1, satisfying the objects of the present invention.

Example 4

A retroreflective sheeting was prepared in the identical manner with Example 1, except: instead of the hexamethylene diisocyanate crosslinking agent, 25 parts by weight of a melamine formaldehyde resin crosslinking agent (CK-300, produced by Nippon Carbide Kogyo K.K.) and 25 parts by weight of a crosslinking catalyst (CK-902, produced by Nippon Carbide Kogyo K.K.) were used in forming the reinforcing layer; and the acrylic resin solution A for the binder layer was replaced by an acrylic resin solution obtained by mixing 80 parts by weight of a toluene/ethyl acetate (7/3) solution (solid component: 30%) of a non-crosslinkable methyl methacrylate (MMA)—ethyl acrylate (EA) copolymer (composition ratio by weight: MMA/EA=46/54) with 20 parts by weight of a toluene/ethyl acetate (7/3) solution (solid component: 30%) of a crosslinkable methyl methacrylate (MMA)—ethyl acrylate (EA)—2-hydroxyethyl methacrylate (2-HEMA) copolymer (composition ratio by weight: MMA/EA/2-HEMA=33/66/1) and 30 parts by weight of titanium oxide: said solution A being mixed with 28 parts by weight of a methyl isobutyl ketone solution B (solid component: 20%) of a methyl methacrylate (MMA)—butyl acrylate (BA)—styrene (St) copolymer (a multi-stage polymerization type internal crosslinking resin); 0.4 part by weight of a melamine formaldehyde resin crosslinking agent (CK-300, produced by Nippon Carbide Kogyo K.K.) and 0.4 part by weight of a crosslinking catalyst (CK-902, produced by Nippon Carbide Kogyo K.K.) to form the binder layer.

The resulting sheeting excelled in uniformity in shape of the joint portions as well as in peeling resistance of the protective film as indicated in later appearing Table 1, satisfying the objects of the present invention.

Example 5

A retroreflective sheeting was prepared in the identical manner with Example 1, except that the acrylic resin solution A forming the binder layer was changed to an acrylic resin solution which was obtained by mixing 100 parts by weight of a toluene/ethyl acetate (7/3) solution (solid component: 30%) of a methyl methacrylate (MMA,)—ethyl acrylate (EA) copolymer (composition ratio by weight: MMA/EA=46/54) with 30 parts by weight of titanium oxide.

The resulting retroreflective sheeting excelled in uniformity in shape of the joint portions as well as in peeling resistance of the protective film as indicated in later appearing Table 1, satisfying the objects of the present invention.

b. Strength after weatherability test

The test specimens were tested of their weatherability 100 times under the following conditions.

UV-exposure 16 hours (fluorescent UV-condensation type)→(70° C. heating 1 hour→25° C. cooling 1 hour→70° C. heating 1 hour→immersion in 25° C. water 1 hour)×2 cycles.

TABLE 1

|  | Shearing stress before thermoforming[1] (dyne/cm$^2$) | | Appearance of joint portions[1] | Peeling resistance of protective film[3] (kg/25 mm) | | | Heat seal-ability[4] | Reflective perfor-mance[5] |
| --- | --- | --- | --- | --- | --- | --- | --- | --- |
|  | reinforcing layer | binder layer |  | initial strength | strength after weatherability test | appear-ance |  |  |
| Example 1 | 9.48 × 10$^6$ | 4.78 × 10$^5$ | 4 | 0.68–2.3 | 0.48–1.7 | 3 | yes | 360 |
| Example 2 | 9.48 × 10$^6$ | 4.78 × 10$^5$ | 4 | 0.57–2.0 | 0.47–1.7 | 3 | " | 308 |
| Example 3 | 9.48 × 10$^6$ | 4.88 × 10$^5$ | 4 | 0.71–2.8 | 0.48–1.7 | 3 | " | 355 |
| Example 4 | 8.01 × 10$^6$ | 9.55 × 10$^5$ | 4 | 0.58–2.0 | 0.46–1.6 | 3 | " | 338 |
| Example 5 | 9.48 × 10$^6$ | 4.68 × 10$^5$ | 4 | 0.70–2.3 | 0.47–1.7 | 3 | " | 351 |
| Comparative Example 1 | 5.31 × 10$^6$ | 4.78 × 10$^5$ | 1 | 0.49–2.2 | 0.26–1.6 | 2 | " | 295 |
| Comparative Example 2 | 1.25 × 10$^7$ | 4.78 × 10$^5$ | 1 | 0.44–2.3 | 0.30–1.7 | 2 | " | 311 |
| Comparative Example 3 | 5.48 × 10$^6$ | 4.78 × 10$^5$ | 2 | 0.25–1.5 | 0.21–1.2 | 1 | " | 348 |

The measuring methods used in the test items as in Table 1 were as follows.

(1) Shearing stress S before thermoforming

Shearing stress was determined by the flow property test method as specified by JIS K-7199 using a CAPIROGRAPH manufactured by Toyo Seiki K.K., at a temperature of 180° C. and an extrusion rate of 5 mm/min.

(2) Appearance of joint portions

Those retroreflective sheetings as formed were observed from their surfaces, and the state of variation in appearance of the joint portions was evaluated according to the following standard:

4 the line width is uniform and no oozing out at the boundaries 3 the line width is relatively uniform but a little oozing out observable at the boundaries 2 the line width varies locally, or heavy oozing out 1 heavy oozing out and the line width is greater than the prescribed (3) Peeling resistance of protective film Each of the retroreflective sheetings as obtained was stuck on a 15 cm-long and 7.5 cm-broad aluminum plate and lines were cut parallel to the longer side, at intervals of 2.5 cm, with a knife.

a. Initial strength

The protective film on the central slip as divided by the cut-in lines in each test specimen was partially peeled off with a knife; the protective film was reinforced with a polyester tape; and thereafter the peel strength of the protective film from the support sheet was measured with Instron-type tensile tester. The measurement was conducted with 90°-peeling and pulling rate of 100 mm/min.

The measurements are indicated by the average minimum peeling strength and average maximum peeling strength in the tensile test.

The test specimens after the weatherability test were measured of their peeling strength in the same manner as above initial strength measurement.

c. Appearance after weatherability test

After conducting the weatherability test same as above, appearance of the test specimens was evaluated according to the following standard:

3 little change in appearance was observed compared with that before the weatherability test 2 slight lifting of the protective film compared with the state before the weatherability test observed, due to partial breakdown of joint portions 1 lifting of the protective film compared with the state before the weatherability test due to breakdown of joint portions occurred over 10% or more of the total surface area.

(4) Heat sealability

The cellular reflective sheetings as obtained were once again thermoformed in the same manner as in Example 1, and evaluated as to whether or not they could be heat-sealed.

(5) Reflective performance

Reflective performance of the formed retroreflective sheetings was measured by the reflective performance-measuring method as described in JIS Z-9117. The angle of observation was 12' and the angle of incidence was 5°.

Industrial Utilizability

The retroreflective sheeting prepared by the method of the present invention excels in uniformity of the joint portions of the support film with the protective film, seldom causes peeling trouble of the protective film in prolonged outdoor use, and is suitable for utilization for marking road signs, number plates of vehicles such as automobiles, motorcycles, etc., construction signs, signboards, etc.

We claim:

1. A method for making encapsulated-lens type retroreflective sheeting comprising:

providing a multi-layer support sheet comprising a binder layer and a reinforcing layer laminated thereto, and a substantial monolayer of glass beads partially embedded in the binder layer with a reflective material underlying the embedded portion of the glass beads; said binder layer comprising non-crosslinkable resin and, said reinforcing layer being formed from crosslinkable resin which is substantially crosslinked and said reinforcing layer having a shearing stress S within a range of $6\times10^6$ to $1.2\times10^7$ dynes/cm$^2$;

placing a light-transmittable protective film over the substantial monolayer of glass beads; and, applying heat and pressure to partially thermoform said support sheet to form a series of linear bond lines which partially bond the binder layer of the support sheet to the protective film;

whereby, the linear bond lines are substantially uniform in shape and peeling resistance of the protective film is improved.

2. A method as described in claim 1, in which the reinforcing layer has a shearing stress S within a range $7\times10^6$–$1.1\times10^7$ dyne/cm$^2$ before the partial thermoforming.

3. A method as described in claim 1, in which the crosslinkable resin is an internal substantially crosslinked type or an external crosslinking type resin.

4. A method as described in claim 1, in which the reinforcing layer has a thickness within a range 5–100 $\mu$.

5. A method as described in claim 1 wherein the binder layer comprises said non-crosslinkable resin or a mixture thereof with a low-crosslinkable resin, said resin or resin mixture having a shearing stress S within a range of $2\times10^5$ to $1.5\times10^6$ dyne/cm$^2$ before the partial thermoforming.

6. A method as described in claim 5, in which the binder layer has a shearing stress S within a range $3\times10^5$–$1.3\times10^6$ dyne/cm$^2$ before the partial thermoforming.

7. A method as described in claim 1, in which the binder layer having a shearing stress S not higher than $2\times10^6$ dyne/cm$^2$ after the partial thermoforming and being fusible.

8. A method as described in claim 1 in which the binder layer is formed from a mixture of 50–90% by weight of a non-crosslinkable resin and 10–50% by weight of a low-crosslinkable resin.

9. A method as described in claim 8 in which said low-crosslinkable resin is a multi-stage polymerization type internal crosslinking resin.

10. A method as described in claim 8, wherein the low-crosslinkable resin component of the binder layer is substantially completely crosslinked before applying heat and pressure to effect partial thermoforming.

11. A method as described in claim 1, in which the binder layer has a thickness within a range 20–200 $\mu$.

12. A method as described in claim 1, in which the retroreflective glass beads have a refractive index within a range 1.7–2.0.

13. A method as described in claim 1, in which the protective film has total light transmittance of at least 20%.

14. A method as described in claim 1, in which at least the surface of the protective file coming into contact with the support sheet has been subjected to an adhesiveness-improving treatment.

15. A method as described in claim 14, in which the adhesiveness-improving treatment is a corona discharge treatment.

16. A retroreflective sheet which is made by the method as described in claim 1.

* * * * *